(12) United States Patent
Wasserkrug et al.

(10) Patent No.: US 10,528,883 B2
(45) Date of Patent: *Jan. 7, 2020

(54) HYBRID ESTIMATION OF TRANSITION PROBABILITY VALUES IN MARKOV DECISION PROCESSES

(71) Applicant: International Business Machines Corporation, Armonk, NY (US)

(72) Inventors: Segev Wasserkrug, Haifa (IL); Alexander Zadorojniy, Haifa (IL); Sergey Zeltyn, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 1125 days.

This patent is subject to a terminal disclaimer.

(21) Appl. No.: 14/848,365

(22) Filed: Sep. 9, 2015

(65) Prior Publication Data

US 2017/0068226 A1 Mar. 9, 2017

(51) Int. Cl.
G06N 7/02 (2006.01)
G05B 13/04 (2006.01)
G05B 17/02 (2006.01)
G06N 7/00 (2006.01)

(52) U.S. Cl.
CPC .............. G06N 7/02 (2013.01); G05B 13/04 (2013.01); G05B 17/02 (2013.01); G06N 7/005 (2013.01)

(58) Field of Classification Search
CPC ........... G06N 5/04; G06N 7/00; G06N 5/045; G06N 7/005; G06N 5/046; G05B 13/00; G05B 13/021; G05B 13/024; G05B 13/026; G05B 17/02
See application file for complete search history.

(56) References Cited

U.S. PATENT DOCUMENTS 7,363,515 B2 * 4/2008 Frazier .................. G06F 21/316
342/13
8,775,347 B2 7/2014 Goel et al.
(Continued)

OTHER PUBLICATIONS

Peiter Abbeel, Discretization of Continuous State Spaced MDP's, Oct. 22, 2011, University of California at Berkeley Dept. of Electrical Engineering & Computer Science, p. 9 (Year: 2011).*
Gosavi, Abhijit; Solving Markov Decision Processes via Simulation; 2014. (Year: 2014).*
Jain, Rahul et al.; Simulation-based optimization of Markov decision processes: An empirical process theory approach; Elsevier; Automatica 46 (2010) 1297-1304. (Year: 2010).*
(Continued)

*Primary Examiner* — Stanley K. Hill
(74) *Attorney, Agent, or Firm* — G. E. Ehrlich (57) ABSTRACT

According to some embodiments of the present invention there is provided a method for determining a control action in a control system using a Markov decision process. The method comprises an action of receiving measured transition probability values of a Markov decision process (MDP) and receiving simulated transition probability values generated by performing a control system simulation. New transition probability values are computed by calculating a measured data count of some of the sensor measurements and a simulated data count of some of the simulated transition data. New transition probability values are computed from a weighted average between the measured transition probability values and the simulated transition probability values using the measured data count and the simulated data count. A new control action is determined based on the one or more new transition probability value.

19 Claims, 2 Drawing Sheets

(56) References Cited

U.S. PATENT DOCUMENTS

| | | | | |
|---|---|---|---|---|
| 9,009,095 B1* | 4/2015 | Fafri | ............... | G06F 17/18 |
| | | | | 706/52 |
| 2009/0299496 A1* | 12/2009 | Cade | ............... | G05B 13/024 |
| | | | | 700/29 |
| 2012/0066168 A1* | 3/2012 | Fadell | ............... | G05B 15/02 |
| | | | | 706/52 |
| 2012/0290278 A1* | 11/2012 | Loohius | ............... | G16B 5/00 |
| | | | | 703/11 |
| 2013/0031035 A1 | 1/2013 | Jeanne et al. | | |
| 2013/0066816 A1* | 3/2013 | Shimomura | ............... | G06N 7/005 |
| | | | | 706/12 |
| 2013/0085974 A1 | 4/2013 | Osogami et al. | | |
| 2014/0195475 A1 | 7/2014 | Levchuk et al. | | |

OTHER PUBLICATIONS

Marbach, Peter et al.; Simulation-Based Optimization of Markov Reward Processes; 2001 IEEE Transactions on Automatic Contol, vol. 46, No. 2; pp. 191-209. (Year: 2001).*

Artur Ara'ujo et al., "TPmsm: Estimation of the Transition Probabilities in 3-State Models", Journal of Statistical Software, Dec. 2014, vol. 62, Issue 4.

Wanida Lerspipatthananon and Peerayuth Charnsethikul., "Using Column Generation Technique to Estimate Probability Statistics in Transition Matrix of Large Scale Markov Chain With Least Absolute Deviation Criteria", Journal of Mathematics and Statistics 10 (3): 331-338, ISSN: 1549-3644, 2014 Science Publications, Published Online Oct. 3, 2014 (http://www.thescipub.com/jmss.toc).

* cited by examiner

HYBRID ESTIMATION OF TRANSITION PROBABILITY VALUES IN MARKOV DECISION PROCESSES

FIELD AND BACKGROUND OF THE INVENTION

The present invention, in some embodiments thereof, relates to control systems and, more specifically, but not exclusively, to using Markov decision processes (MDP) for determining optimal control actions of control systems.

Markov decision processes and their extensions, such as constrained Markov decision processes (CMDP), partially-observable MDP (PO-MDP), and the like, are decision optimization techniques in many practical system applications. The MDP are decision-making methods used when the decision outcome is determined in part randomly and in part controllably by a control system, such as a decision control system. In this scenario, the MDP method decides which control action at each time point is most likely to bring the system to optimal operational performance, such as when a cost function is minimized and/or a reward function is maximized. Each control action transitions the system from a beginning state to a new state, such as an ending state, where the new state may be determined, at least in part, by the control action chosen at that time point. Each control action is a combination of one or more control variables, such as a speed of pump, a temperature of a boiler, and an addition of a certain amount of a chemical, and the like. As used herein, the term control action means a specific action of changing a control variable to control a system at a specific discrete time point. Each system state is associated with one or more cost values and/or one or more reward values. The reward and cost values at each starting system state determine the optimum control action by computing a cost and/or reward function over the possible control actions for the ending system state. For example, when an optimal control action transitions the current system state to a new system state, the output value of the reward function may increase and/or the output value of the cost function may decrease.

The system state is a particular configuration of systems variables, such as a particular set of values for the system variables each acquired from a sensor. The values for each system variable are stratified into steps, such that each value step of a variable is a unique variable state. For example, each variable state is a value of system sensor. Each unique set of value steps for the system variables is a particular system state, such as the values of all system sensors attached to the application system. As used herein, the term system state means a specific set of values for all system variables of a system under control by a control system. System variables may be of two types: controllable and action-independent system variables. For example, action-independent system variables in an example application of a wastewater treatment plant are influent flow, influent chemical load, electricity cost time window, and the like. Actions and controllable system variables do not affect action-independent system variables. Controllable system variables describe internal and/or output characteristics of the system, and controllable system variables may be affected by past actions and system variables of any type.

For example, a sensor may be a hardware sensor of a physical measurement, such as a temperature sensor, and/or a software sensor, such as monitoring code for one or more data streams. In an industrial system application, a hardware sensor may be a temperature sensor, a position sensor, a pressure sensor, a flow sensor, a light sensor, a chemical species sensor, a pH sensor, a gas sensor, a fluid level sensor, a status sensor, a purity sensor, and the like. For example, a software sensor may be a monitoring program for an array of sensors and may sense the presence of sensor value patterns.

To select the optimal control action of a given system state, previously recorded system state transitions and associated control actions are analyzed to determine the transition probabilities when the system was in the same situation, or system state. For example, the control action that has the highest probability of bringing the system to a new state that has a higher reward value and/or lower cost value may be selected as the optimal control action. For example, a cost and/or reward function are computed for multiple states and control actions for a time range under consideration, such as over the coming week. For example, the time range is a long-term time range extending over months, years and the like. These calculations may use dynamic programming and/or linear programming techniques to find the optimal control actions based on the cost and/or reward functions.

Thus the transition probability values, such as probability values organized in a transition probability matrix, constitute a key component of determining control actions in the MDP method. Most implementations of MDP methods use known transition probabilities from previously acquired and/or measured system transition data and/or estimated transition probabilities from simulations of one or more system models. For example, measured transition data are sets of system sensor values acquired before and after a control action thereby recording the system state transition, where the system state transition occurred at a particular time. As used herein, the term transition data or transition datasets means the beginning system state, the executed control action, and the ending system state of a system state transition. For example, simulated transition data are sets of system sensor values simulated using one or more system models before and after a control action thereby recording the system state transition. The system models may be a series of equations that predict the changes to sensor values after execution of a control action. For example, the simulate changes to concentrations of chemical compounds after raising the temperature of a boiler according to a differential chemical equation.

MDP methods may be used to determine optimal operation, such as optimal decisions and/or control actions, in maintenance systems, health care systems, agriculture systems, management systems of water resources, wastewater treatment systems, and the like.

SUMMARY OF THE INVENTION

According to some embodiments of the present invention there is provided a method for determining a control action in a control system using a Markov decision process. The method comprises an action of receiving two or more measured transition probability values of a Markov decision process (MDP) of a control system, where each of the measured transition probability values is computed from two or more sensor measurements of the control system. The method comprises an action of receiving two or more simulated transition probability values of the MDP each computed from two or more simulated transition data generated by performing one or more simulation using one or more system model of the control system. The method comprises an action of computing one or more new transition probability value, by calculating a measured data count of some of the sensor measurements and a simulated data count of some of the simulated transition data, and computing the one or more new transition probability value from a weighted average between one of the measured transition probability values and one of the simulated transition probability values using the measured data count and the simulated data count. The method comprises an action of determining one or more new control action from two or more control actions of the control system based on the one or more new transition probability value.

Optionally, the weighting is computed further using a weighting value previously computed by correlating between some of the measured transition probability values during a predefined time window and respective the one or more new transition probability value.

Optionally, an ending time of the predefined time window is one or more of a most recent time of the sensor measurements and a date when the weighting value is computed.

Optionally, the probability values are computed from a first system state of two or more system states of the control system to a second system state of the system states after performing one of the control actions.

Optionally, each of the system states comprises two or more system variable values, where each of the system variable values corresponds to a value of a sensor of an application system.

Optionally, each of the system states is associated with one or more of a reward value and a cost value, and where determining the one or more new control action is further based on a respective reward value and/or cost value.

Optionally, the one or more new control action is two or more control actions and the corresponding reward values and/or cost values are used to compute a reward function and/or a cost function for the control actions.

Optionally, the application system is an industrial system and each of the sensors is a sensor from the group of a temperature sensor, a position sensor, a pressure sensor, a flow sensor, a light sensor, a chemical species sensor, a pH sensor, a gas sensor, a fluid level sensor, a status sensor, a purity sensor, and the like.

Optionally, the receiving and computing is performed by a first processing unit and the determining is performed by a second processing unit.

Optionally, the weighting is computed using a weighting value previously computed by detecting temporal patterns between some of the measured transition probability values and respective the one or more new transition probability value.

Optionally, the plurality of measured transition probability values are computed from some of the measured transition data previously received.

Optionally, the plurality of simulated transition probability values are computed from some of the simulated transition data previously received.

Optionally, the method comprises an action of receiving two or more new measured transition data and repeating the actions of the correlating to compute the weighting value, the computing and the determining.

Optionally, the method comprises an action of receiving two or more new measured transition data and repeating the actions of the computing and the determining.

Optionally, the method comprises an action of receiving two or more new simulated transition data and repeating the actions of the computing and the determining.

Optionally, the plurality of new simulated transition data is simulated from a new system model.

According to some embodiments of the present invention there is provided a computer program product for determining a control action in a control system using a Markov decision process, the computer program product comprising a computer readable non-volatile storage medium. The medium stores first program instructions executable by a processor to cause the device to receive two or more measured transition probability values of a MDP of a control system, where each of the measured transition probability values is computed from some of two or more sensor measurements of the control system. The medium stores second program instructions executable by a processor to cause the device to receive two or more simulated transition probability values of the MDP each computed from some of two or more simulated transition data generated by performing one or more simulation using one or more system model of the control system. The medium stores third program instructions executable by a processor to cause the device to compute one or more new transition probability value, by calculating an measured data count of some of the sensor measurements and a simulated data count of some of the simulation transition data, and computing the one or more new transition probability value from a weighted average between one of the measured transition probability values and one of the simulated transition probability values using the measured data count and the simulated data count. The medium stores fourth program instructions executable by a processor to cause the device to determine one or more recommended control action from the control actions based on the one or more new transition probability value.

According to some embodiments of the present invention there is provided a computerized system for determining a control action in a control system using a Markov decision process. The system comprises a network interface for receiving system state transition data from a simulation system and an application system. The system comprises one or more processing unit. The system comprises one or more storage device having processor instructions stored thereon to cause the one or more processing unit to receive two or more measured transition probability values of a MDP of a control system, where each of the measured transition probability values is computed from some of two or more sensor measurements of the control system. The processor instructions cause the one or more processing unit to receive two or more simulated transition probability values of the MDP each computed from some of two or more simulated transition data generated by performing one or more simulation using one or more system model of the control system. The processor instructions cause the one or more processing unit to compute one or more new transition probability value, by calculating an measured data count of some of the sensor measurements and a simulated data count of some of the simulation transition data, and computing the one or more new transition probability value from a weighted average between one of the measured transition probability values and one of the simulated transition probability values using the measured data count, and the simulated data count. The processor instructions cause the one or more processing unit to determine one or more new control action from two or more control actions of the control system based on the one or more new transition probability value.

Optionally, the one or more processing unit performs the action of sending the one or more new transition probability value to one or more second processing unit, where the determining is performed on the one or more second processing unit.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention may involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to control systems and, more specifically, but not exclusively, to using Markov decision processes (MDP) for determining optimal control actions of control systems.

The present disclosure uses operational optimization of a wastewater treatment plant (WWTP) as a possible application, but embodiments of the present invention are applicable to many systems that use probabilistic approaches to decision making. For example, embodiments of the present invention are applicable to maintenance systems, health care systems, agriculture systems, water resource management systems, queuing systems, epidemic process systems, robotic motion planning scenarios, and the like. Other applications for MDP methods incorporating embodiments of the present invention are described by White, D. J. in "A survey of applications of Markov decision processes" published in Journal of the Operational Research Society (vol., 44 (1993), no. 11, 1073-1096), which is incorporated by reference in its entirety.

In many MDP applications, including WWTP applications, the problem of estimating transition probability values constitutes a significant challenge even when the system is completely observable and/or measureable. The number of system states and control actions may be very large. For example, even a partial WWTP system involves more than 1000 system states and more than 100 control actions, where system states and control actions are as described above. Hence, in the WWTP example the MDP method requires measurement and/or simulation of more than $1000^2 \cdot 100 = 100$ million transition probability values which may give rise to a number of challenges. First, it may be hard to estimate these probabilities from measured system transition data, such as acquiring sets of system sensor values before and after executing a control action. For example, 10e+07 transition probability values may require at least 100 observations of each of some or all of the transitions for sufficient statistical power, for example giving a total of millions or even billions of observable transitions under ideal uniform coverage. Second, estimation of transition probabilities to and from non-optimal states, that a reasonably managed system visits very rarely when at all, may not have sufficient transition data for statistical estimation.

In some applications, including WWTP applications, simulations may estimate transition probability values. However, computerized simulators of complicated system models do not have enough processing power to cover all system states under all actions for a reasonable number of time points in order to get a reliable and straightforward statistical estimation in a reasonable amount of time. For example, WWTP simulation modeling involves solving a large number of differential equations related to different biochemical variables processes. Around 1,000 WWTP simulation days could be run in a single calendar day. The time interval between transitions may be equal to one hour. Hence, four days of simulation give approximately 100 thousand transitions: a small number given a problem size of 100 million transition possibilities. Depending on the system transition speed, the time between transitions may be between a few minutes and a few months.

Therefore, measured system transition data and simulated transition data of complicated systems, such as in a WWTP example, may be available for computing transition probability values. These two data sources each have their own advantages and drawbacks, making a straightforward weighted combination of the transition probability values computed from both sources problematic. Some weight denoted $\alpha$, where $0 < \alpha < 1$, may be used to combine transition probability values computed from simulation data and measured data. Deciding on a value of $\alpha$ to use is not obvious, nor is the equation to compute hybrid transition probability values obvious. Embodiments of the present invention describe solutions to these challenges.

According to some embodiments of the present invention, there are provided systems and methods for computing hybrid transition probability values of a MDP method from a combination of transition probability values from actual system state measurements and from simulations of one or more system models. The actual system variable values of system state measurements are received from sensors of the application system, possibly through the control system. The simulation transition data is received from a simulation system that uses one or more system models to simulate the beginning system state, the control action, and the ending system state. The computation of the hybrid transition probability values takes into account number of measured and simulated transitions in each system state, and a weighting value denoted $\alpha$. Optionally, the transition probability values computed for recently acquired actual system state measurements are used to find the best value for a when computing hybrid transition probability values. For example, the hybrid transition probability values are computed using a weighting value and the relative number of measured and simulated datasets. For example, the hybrid transition probability values are computed using a temporal weighting value.

The hybrid transition probability values allow the MDP system to compute the optimal control actions of the application system, where today there is no way to make this determination, as the transition probability values for the measured and simulated datasets are not combined. Thus, the operation of the MDP system and application system is improved.

Optionally, a hybrid transition probability value is computed from measured transition probability values and simulated transition probability values weighted by one or more statistical parameter of the underlying measured datasets and simulated datasets. For example, a number of datasets is used in weighting the hybrid transition probability value. For example, a variance of dataset measurements is used in weighting the hybrid transition probability value.

Optionally, a weighting factor values for computing a hybrid transition probability value is determined by a temporal analysis of the underlying measured datasets associated with measured transition probability values. For example, a temporal threshold is used to divide the measured datasets into recent and historic datasets and the recently-measured transition probability values are used to calibrate the weighting factor by comparing these to the hybrid transition probability values computed from historic and simulated datasets. For example, a temporal pattern is used to find the optimal weighting value for computing hybrid transition probability values.

Before explaining one or more embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
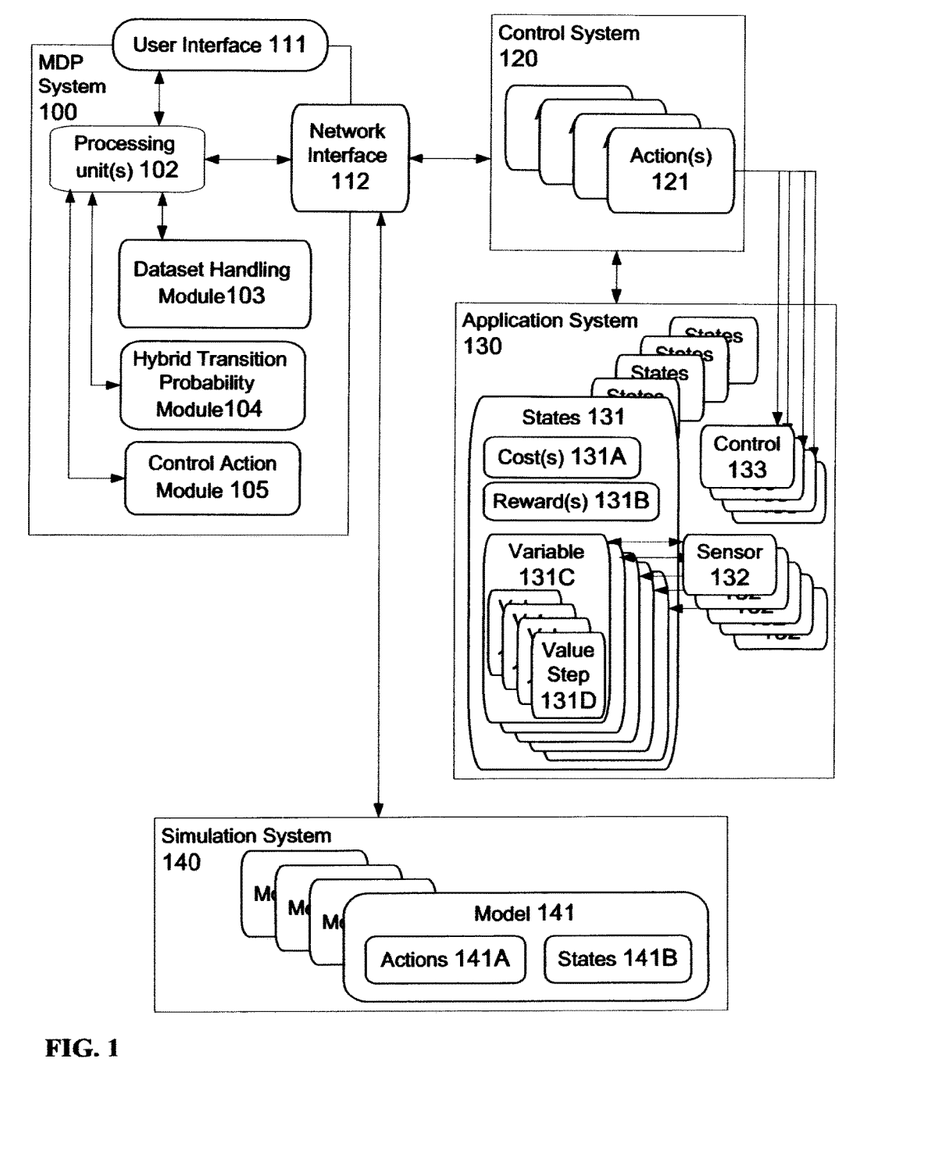
FIG. 1 is a schematic illustration of a system for determining a system control action from computed hybrid transition probability values in Markov decision processes, according to some embodiments of the invention.

Reference is now made to FIG. 1, which is a schematic illustration of a system determining a system control action from computed hybrid transition probability values in Markov decision processes s, according to some embodiments of the invention. The MDP system 100 comprises a network interface 112, a user interface 111, and one or more processing units 102, such as one or more processors, computers, computerized systems, and the like. The MDP system 100 has stored thereon modules of processor instructions, such as modules containing computer code, for execution by the processing unit(s) 102. The network interface 112 may allow the device to exchange system state transition data, control actions, and the like, with one or more control system 120, one or more application system 130, one or more simulation system 140, and/or the like. For example, sets of sensor values acquired by sensors 132 attached to the application system are received using the network interface 112 from the application system 130, control system 120, and the like. For example, previous measured transition beginning and ending system states, and control actions are received from the control system 120 using the network interface 112 as a measured dataset. Optionally, measured datasets are received by the processing unit(s) 102 to compute transition probabilities between states 131 of an application system 130 given an action 121 of a control system 120. Optionally, measured datasets are received together with measured transition probability values previously computed from the measured data. Each control action 121 may change the value of a control 133 in the application system 130, such as a boiler temperature, a motor shaft rotation speed, a valve opening setting, and the like. Each system state 131 is associated with one or more cost values 131A, one or more reward values 131B, and two or more system variables 131C. Each system variable may be associated with a system sensor 132 and may comprise two or more value steps 131D for the sensor value. Each value step is a specific range of values for that specific sensor 132 and associated system variable 131C.

For example, the difference by one value step corresponds to an adjacent value interval when discretization of a continuous variable to intervals of value ranges is performed. For example, a system temperature sensor value in one system state is 99.4 degrees Celsius that corresponds to the value range of 98 to 102 degrees Celsius, and in another state the temperature sensor value is 103.2 degrees Celsius that corresponds to the value range of 102 to 106 degrees Celsius.

The code of the dataset handling module 103 is executed by the processing unit(s) 102 to receive and manage the measured transition datasets for each measured system state 131. Optionally, the processing unit(s) 102 are adapted by the code to compute measured transition probabilities values. The processing unit(s) 102 are adapted by the code to receive simulated transition datasets from a simulation system 140 and computed with one or more system models 141. Each system model 141 computes simulated transition datasets, where each simulated transition dataset has simulated starting and ending system states 141B, and a simulated control action 141A.

The code of the hybrid transition probability module 104 executed by the processing unit(s) 102 computes one or more hybrid transition probability values after filtering the measured dataset into recent datasets and historic datasets. For example, the code adapts the processing unit(s) 102 to compute recent transition probability values from the recent datasets. For example, the code adapts the processing unit(s) 102 to compute a hybrid transition probability values from a weighting function between the transition probability values derived from measured datasets and simulated datasets. To adjust the weighting value, the transition probability values of historic datasets and simulated datasets are computed with the weighting function for different weighting values. The weighting value with the highest correlation between the recent transition probability values and the hybrid historic transition probability values is used for computing the hybrid transition probability values and from these the control actions.

The code of the control action module 105 executed by the processing unit(s) 102 computes a preferred control action based on one or more hybrid transition probability values.

The user interface 111 may allow an operator of the MDP system 100 to control the operation of the MDP system 100, the processing unit(s) 102, the processor instruction modules as at 103, 104 and 105, and the like.

Optionally, the MDP system and simulation system are incorporated into a single computerized device, optionally with multiple processors.

Optionally, the hybrid transition probability module 104 is incorporated into a computerized device that is not part of the MDP system 100.

Figure 2:
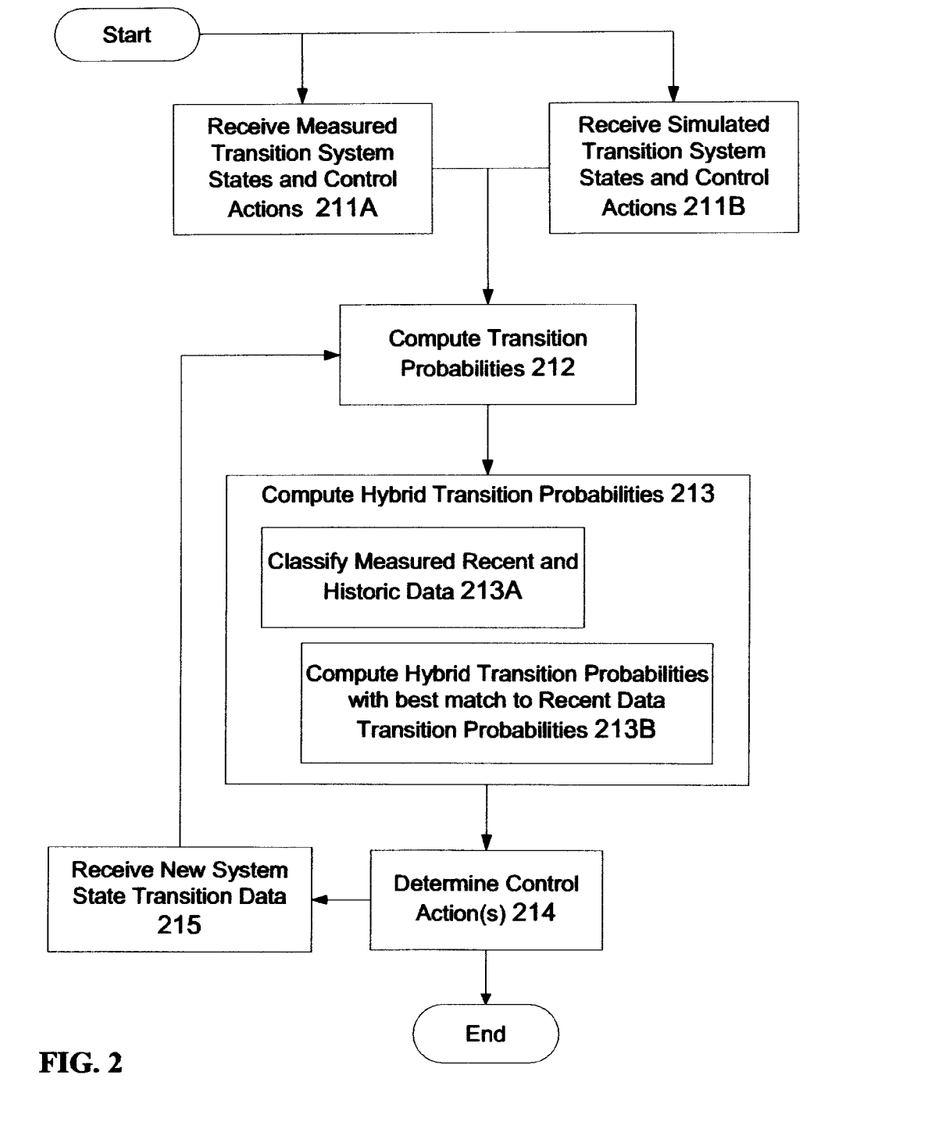
FIG. 2 is a flowchart of a method for determining a new control action from computed hybrid transition probability values in Markov decision processes, according to some embodiments of the invention.

Reference is now made to FIG. 2, which is a flowchart of a method for determining a new control action from computed hybrid transition probability values in Markov decision processes, according to some embodiments of the invention. The dataset handling module 103 contains processing instruction to receive 211A and 211B transition datasets by the processing unit(s) 102 of the MDP system 100, and optionally to instruct the processing unit(s) 102 to compute 212 the transition probabilities from received transition data, such as measured transition data 211A, simulated transition data 211B, and the like. The received transition data may comprise measured transition states and control actions 211A of a system and/or simulated transition data 211B. For example, previously acquired, measured and/or recorded system state transition data and actual control actions are received by the processing unit(s) 102 from a repository, such as a hard disk, a database, a system archive, a digital data storage unit, and the like.

For example, application system sensor values are acquired and stored as the beginning system state. A control action is executed by a control system 120, such as the setting of a thermostat is changed from a value of 45 degrees Celsius to a value of 50 degrees Celsius. After a predetermined time, the ending system state is acquired by recording another set of the application system sensor values. The beginning state, control action and ending state is stored as the transition data. When enough transition data acquired at different times exists for a particular beginning system state, the transition probability values may be computed for the different control actions executed at that beginning system state. For example, the transition data contains a beginning system state, such as BSS1, that was recorded in the application system 250 times, and each time the application system was in BSS1 one of three control actions, such as CA1, CA2 and CA3, was performed. The ending system state was one of five possible system states, such as ESS1, ESS2, ESS3, ESS4, and ESS5, and the transition probability values for all combinations of beginning system state, control actions, and ending system states are computed from the 250 observations.

For example, previously recorded simulated system state transition data and simulated control actions are received 211B by the processing unit(s) 102 from a computerized storage unit and/or a simulation system 140. For example, a beginning system state is selected from a list of system states, such as a list of simulated sensor values, and the simulation system 140 executes a simulation of a system model 141 using that beginning system state and selecting a control action from a list of control actions 141B. The simulation system solves a series of model 141 equations describing the operation of the application system in that situation, resulting in a new set of simulated sensor values that comprise the ending system state 141A. When multiple transition data has been simulated for a particular beginning system state, the transition probability values may be computed for that beginning system state. The transition data and/or transition probability values may be stored on a system storage unit, such as a repository, a database, a hard disk, and the like, and later received by the processing unit(s) 102 for computing new hybrid transition probabilities. For example, the a beginning system state, such as BSS1, was simulated by a system model in the simulation system 2250 times, and each time the application system was in BSS1 one of three control actions, such as CA1, CA2 and CA3, was simulated. The ending system state was one of five possible system states, such as ESS1, ESS2, ESS3, ESS4, and ESS5, and the transition probability values for all combinations of beginning system state, control actions, and ending system states are computed from the 2250 observations.

The received measured datasets may include a time stamp for the acquisition time of the transition measurements.

Before describing the computation 213 of hybrid transition probability values, some notations used in the computations are described. Let $N_S$ denote number of simulated transitions, and $N_D$ denote the number of measured transitions, such as actual transition observed in a system. Each transition comprises a beginning system state, a control action, and an ending system states, together referred to herein as a transition dataset. Assume that both simulation and measured transition datasets share the same control actions, such as the same control action space $\{i:1\leq i\leq I\}$. Different system states of the datasets may be analyzed when the number of observations in measured data is relatively small. Assume that there are J system states in the simulation datasets and $J_D\leq J$ system states in the measured datasets. A state denoted j from measured dataset states corresponds to the state denoted U(j) that from the simulation dataset states. When the two dataset states are identical: $U(j)=\{j\}$. Let V denote the inverse operator to U: when a state j belongs to the simulation state space, then V(j) is the corresponding state of the measured state space. Let $\tilde{P}_{D,i}^{j,k}$, $1\leq i\leq I$, $1\leq j,k\leq J_D$, denote estimates of transition probabilities based on measured data. Let $P_{S,i}^{j,k}$, $1\leq i\leq I$, $1\leq j,k\leq J$, denote estimates of transition probabilities based on simulation data. When $J_D<J$, the probability values based on measured data should be recalculate using the equation:

$$P_{D,i}^{j,k} = \frac{\tilde{P}_{D,i}^{V(j),V(k)}}{|U(k)|}, 1 \leq i \leq I, 1 \leq j, k \leq J,$$

where |U(k)| is the number of states in the set U(k).

When the weighting value is known, such as denoted a where $0\leq\alpha\leq 1$, the processing unit(s) 102 may compute 213B the hybrid transition probability value with the following calculations, as embodied in the code of the hybrid transition probability module 104. Let $N_{S,i}^j$, $1\leq i\leq I$, $1\leq j\leq J$, denote the count of transitions of action i in state j for simulation data and $\tilde{N}_{D,i}^j$, $1\leq i\leq I$, $1\leq j\leq J_D$, the count of transitions for measured data. When $J_D<J$, the following counts are computed for the measured datasets: $N_{D,i}^j = \tilde{N}_{D,i}^{V(j)}/|U(j)|$, $1\leq i\leq I$, $1\leq j\leq J$.

Hybrid transition probabilities values may be computed using the formula:

$$P_{H,i}^{\alpha,jk} = \frac{\alpha(N_{S,i}^j/N_S) \cdot P_{S,i}^{j,k} + (1-\alpha)(N_{D,i}^j/N_D) \cdot P_{D,i}^{j,k}}{\alpha(N_{S,i}^j/N_S) + (1-\alpha)(N_{D,i}^j/N_D)},$$

$$1 \leq i \leq I, 1 \leq j, k \leq J, 0 \leq \alpha \leq 1.$$

This computation takes into account both the weighting value a and the number of transitions in measured data and simulation data. When $\alpha=0.5$, $J_D=J$, $N_S=N_D$ then the probabilities are maximum likelihood estimates in the pooled measured and simulated data.

Optionally, when the weighting value is not known, the measured datasets may be classified 213A into recent and historic datasets, and each analyzed to determine the weighting value. A time unit is equal to a step in a Markov chain, and measured datasets acquired over a recent time window [0,T] are defined by system states $J_0, \ldots, J_T$ and actions $I_0, \ldots, I_T$. The log-likelihood of the recent data is given by the formula $L(\alpha) = \Sigma_{t=0}^{T-1} \log(P_{H,I_t}^{\alpha,J_t,J_{t+1}})$. Maximizing the value $\alpha^* = \arg \max L(\alpha)$ using an optimization technique, determines the optimal weighting value $\alpha^*$ that best explains the recent transition probabilities of the system in the best possible way from the hybrid transition probabilities. This optimal weighting value $\alpha^*$ may be subsequently used in computing 213B the hybrid transition probability values and determining control actions 214.

Optionally, when the system further receives iteration of new measured and simulated datasets, the classification 213A of recent and historic data may be changed and a new optimal weighting value $\alpha^*$ computed. For example, the previous recent datasets are added to the historical datasets and the new datasets are used as the recent datasets. A new optimal weighting value $\alpha^*$ may then be computed based on the new classification. Optionally, in each iteration the simulation model is updated.

Once the hybrid transition probability values have been computed, a control action may be determined 214 for a given starting system state based on the hybrid transition probability values of actions, the cost values of the respective ending states, and/or the reward values of the respective ending states.

Optionally, the hybrid transition probability values may be used to construct a series of control actions from the starting system state to one or more intermediate system states and an ending system state by computing a cost and/or reward function for all the intermediate system states. For example, a high transition probability to a low reward intermediate system state may be beneficial for optimal system performance by bringing the ending system state to a high reward state. For example, the cost and/or reward functions for the series of systems states comprises time values of the time between system state transitions according to the hybrid transition probability values.

The methods as described above may be used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

A used herein the term "about" refers to ±10%.

The terms "comprises", "comprising", "includes", "including", "having" and their conjugates man "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method for optimizing a control action of a control system using a Markov decision process, by identifying a control action having a highest probability of bringing a respective controlled application system to a system state having an optimal combination of reward and cost values, comprising:
    receiving a plurality of measured transition probability values of a Markov decision process (MDP) of a control system, wherein each of said plurality of measured transition probability values is computed from some of a plurality of sensor measurements of said control system, said plurality of sensor measurements is received from a plurality of sensors of an application system;
    receiving a plurality of simulated transition probability values of said MDP each computed from some of a plurality of simulated transition data generated by performing at least one simulation using at least one system model of said control system;
    computing, by at least one hardware processor, at least one new transition probability value, each computed by:
        calculating a count of transitions of some of said plurality of sensor measurements data and a count of transitions of some of said plurality of simulated data, and
        computing said each of said at least one new transition probability value from a weighted average between a respective one of said plurality of measured transition probability values multiplied by said calculated count of transitions of said measured data and a respective one of said plurality of simulated transition probability values multiplied by said calculated count of transitions of said simulated data;
    determining, by said at least one hardware processor, at least one new control action from a plurality of control actions of said control system by processing said MDP with said at least one new transition probability value, said at least one new control action having a highest probability of bringing a respective application system, controlled by said control system, to a system state having an optimal combination of reward and cost values; and
    controlling said application system by providing said at least one new control action for activation by said control system.

2. The method of claim 1, wherein a weighting of said weighted average is computed further using a weighting value previously computed by correlating between some of said plurality of measured transition probability values during a predefined time window and respective said at least one new transition probability value.

3. The method of claim 2, wherein an ending time of said predefined time window is at least one of a most recent time of said plurality of sensor measurements and a date when said weighting value is computed.

4. The method of claim 1, wherein said at least one new transition probability value is computed from a first system state of a plurality of system states of said control system to a second system state of said plurality of system states after performing one of said plurality of control actions.

5. The method of claim 4, wherein each of said plurality of system states comprises a plurality of system variable values, wherein each of said plurality of system variable values corresponds to a value of one of said plurality of sensors of said application system.

6. The method of claim 4, wherein each of said plurality of system states is associated with at least one of a reward value and a cost value, and wherein determining said at least one new control action is further based on respective said at least one of said reward value and said cost value.

7. The method of claim 6, wherein said at least one new control action is a plurality of control actions and corresponding said at least one of said reward value and said cost value are used to compute at least one of a reward function and a cost function for said plurality of control actions.

8. The method of claim 5, wherein said application system is an industrial system and each of said plurality of sensors is a sensor from the group of a temperature sensor, a position sensor, a pressure sensor, a flow sensor, a light sensor, a chemical species sensor, a pH sensor, a gas sensor, a fluid level sensor, a status sensor, and a purity sensor.

9. The method of claim 1, wherein said receiving and computing is performed by said at least one hardware processor and said determining is performed by at least one second hardware processing.

10. The method of claim 1, wherein a weighting of said weighted average is computed using a weighting value previously computed by detecting temporal patterns between some of said plurality of measured transition probability values and respective said at least one new transition probability value.

11. The method of claim 1, wherein said plurality of measured transition probability values are computed from at least two of said plurality of measured transition data previously received.

12. The method of claim 1, wherein said plurality of simulated transition probability values are computed from at least two of said plurality of simulated transition data previously received.

13. The method of claim 2, further comprising an action of receiving a plurality of new measured transition data and repeating the actions of said correlating to compute said weighting value, said computing and said determining.

14. The method of claim 1, further comprising an action of receiving a plurality of new measured transition data and repeating the actions of said computing and said determining.

15. The method of claim 1, further comprising an action of receiving a plurality of new simulated transition data and repeating the actions of said computing and said determining.

16. The method of claim 15, wherein said plurality of new simulated transition data is simulated from a new system model.

17. A computer program product for optimizing a control action of a control system using a Markov decision process (MDP), by identifying a control action having a highest probability of bringing a respective controlled application system to a system state having an optimal combination of reward and cost values, said computer program product comprising a non-transitory computer readable non-volatile storage medium having stored thereon:

first program instructions executable by a hardware processor to cause said device to receive a plurality of measured transition probability values of a MDP of a control system, wherein each of said plurality of measured transition probability values is computed from some of a plurality of sensor measurements of said control system, said plurality of sensor measurements is received from a plurality of sensors of an application system;

second program instructions executable by said hardware processor to cause said device to receive a plurality of simulated transition probability values of said MDP each computed from some of a plurality of simulated transition data generated by performing at least one simulation using at least one system model of said control system;

third program instructions executable by said hardware processor to cause said device to compute at least one new transition probability value, by calculating a count of transitions of measured data of some of said plurality of sensor measurements and a count of transitions of simulated data of some of said plurality of simulation data, and computing each of said at least one new transition probability value from a weighted average between a respective one of said plurality of measured transition probability values multiplied by said count of transitions of measured data and a respective one of said plurality of simulated transition probability values multiplied by said count of transitions of simulated data;

fourth program instructions executable by said hardware processor to cause said device to determine at least one new control action from a plurality of control actions by processing said MDP with said at least one new transition probability value, said at least one new control action having a highest probability of bringing a respective application system, controlled by said control system, to a system state having an optimal combination of reward and cost values; and fifth program instructions executable by said hardware processor to cause said device to control said application system by providing said at least one new control action for activation by said control system.

18. A computerized system for optimizing a control action of a control system using a Markov decision process (MDP), by identifying a control action having a highest probability of bringing a respective controlled application system to a system state having an optimal combination reward and cost values, comprising:

a network interface for receiving system state transition data from a simulation system and an application system;

at least one hardware processor; and at least one storage device having processor instructions stored thereon to cause said at least one hardware processor to perform the actions of:

receiving a plurality of measured transition probability values of a MDP of a control system, wherein each of said plurality of measured transition probability values is computed from some of a plurality of sensor measurements of said control system, said plurality of sensor measurements is received from a plurality of sensors of an application system;

receiving a plurality of simulated transition probability values of said MDP each computed from some of a plurality of simulated transition data generated by performing at least one simulation using at least one system model of said control system;

computing at least one new transition probability value, each computed by:

calculating a count of transitions of measured data of some of said plurality of sensor measurements and a count of transitions of simulated data of some of said plurality of simulation data, and computing said each of said at least one new transition probability value from a weighted average between a respective one of said plurality of measured transition probability values multiplied by said count of transitions of measured data and a respective one of said plurality of simulated transition probability values multiplied by said count of transitions of simulated data;

determining at least one new control action from a plurality of control actions of said control system by processing said MDP with said at least one new transition probability value, said at least one new control action having a highest probability of bringing a respective application system, controlled by said control system, to a system state having an optimal combination of reward and cost values; and controlling said application system by providing said at least one new control action for activation by said control system.

19. The computerized system of claim 18, further comprising said at least one hardware processor performing the action of sending said at least one new transition probability value to at least one second hardware processor, wherein said determining is performed on said at least one second hardware processor.

* * * * *